United States Patent

Takami et al.

[11] Patent Number: 5,840,086
[45] Date of Patent: Nov. 24, 1998

[54] METHOD FOR MANUFACTURING PACKAGED SOLID ELECTROLYTIC CAPACITOR

[75] Inventors: Katsuhiro Takami; Nobutoshi Kodama, both of Kyoto, Japan

[73] Assignee: Rohm Co., Ltd., Kyoto, Japan

[21] Appl. No.: 627,608

[22] Filed: Apr. 4, 1996

[30] Foreign Application Priority Data

| Apr. 5, 1995 | [JP] | Japan | 7-080141 |
| May 19, 1995 | [JP] | Japan | 7-120945 |
| Mar. 21, 1996 | [JP] | Japan | 8-063601 |

[51] Int. Cl.$^6$ ............ H01G 9/00; G01R 31/26; H01L 21/66
[52] U.S. Cl. ............................. 29/25.03; 438/14
[58] Field of Search ................ 29/25.03; 438/14

[56] References Cited

U.S. PATENT DOCUMENTS

| 4,660,127 | 4/1987 | Gunter . |
| 5,099,397 | 3/1992 | Edson et al. . |
| 5,315,474 | 5/1994 | Kuriyama . |
| 5,402,307 | 3/1995 | Kuriyama . |
| 5,478,965 | 12/1995 | Hashiba . |

FOREIGN PATENT DOCUMENTS

| 4-87314 | 3/1992 | Japan . |
| 4-113609 | 4/1992 | Japan . |

*Primary Examiner*—John Niebling
*Assistant Examiner*—Josetta I. Jones
*Attorney, Agent, or Firm*—McDermott, Will & Emery

[57] ABSTRACT

An improved method for manufacturing a capacitor packaged by synthetic resin after welding an anode bar of a capacitor element with a lead terminal of a lead frame and electrically connecting a cathode of the capacitor element with another lead terminal of the lead frame, wherein the capacitor is assembled after measuring an inclination of the capacitor element in the horizontal/vertical direction after welding the anode bar of the capacitor element with the lead terminal and correcting the inclination of the capacitor element by pressing a portion of the lead terminal to which the anode bar is welded corresponding to the direction of the inclination when the inclination exceeds a predetermined value. As a result, no stress is applied to the capacitor element itself, so that no element is rendered defective or no element characteristic is damaged. In the same time, no capacitor element part will protrude out of the package or no thin package portion is created due to the inclination of the capacitor element, so that the reliability is kept.

8 Claims, 6 Drawing Sheets

METHOD FOR MANUFACTURING PACKAGED SOLID ELECTROLYTIC CAPACITOR

BACKGROUND OF THE INVENTION

The present invention relates to a method for manufacturing a packaged solid electrolytic capacitor in which a capacitor element part is packaged by synthetic resin among solid electrolytic capacitors such as a tantalum solid electrolytic capacitor or an aluminum solid electrolytic capacitor.

As disclosed in Japanese Patent Laid-Open No. 20891/1994 for example and as shown in FIG. 10 herein, a packaged solid electrolytic capacitor of this sort is generally constructed by disposing an anode lead terminal 1 made from a metal plate and a cathode lead terminal 2 similarly made from a metal plate so as to face each other on an approximately same plane, by disposing a capacitor element 3 between the both lead terminals 1 and 2 so as to secure an anode bar 5 which projects out of one end face of a chip piece 4 of the capacitor element 3 on a tip of the anode lead terminal 1 by welding or the like, by connecting a tip of the cathode lead terminal 2 and a cathode film 6 on the surface of the chip piece 4 via a safety fuse line 7 for temperature/over-current or by connecting the tip of the cathode lead terminal 2 directly with the chathode film 6 on the surface of the chip piece 4 and by packaging the whole by a mold section 8 made from synthetic resin.

Japanese Patent Laid-Open No. 244233/1994, a prior art technology, has proposed the following method for manufacturing such a packaged solid electrolytic capacitor having the above-mentioned structure.

That is, it uses a lead frame made from a metal plate in which anode lead terminals and cathode lead terminals are formed in one body so as to extend inward from a pair of right and left side frames in the longitudinal direction with an adequate pitch. While transferring the lead frame in the longitudinal direction thereof, a capacitor element is supplied between each of the anode lead terminal and the cathode lead terminal and an anode bar of the capacitor element is secured to the anode lead terminal by welding or the like in a first stage. Next, a chip piece of the capacitor element and the cathode lead terminal is connected by a safety fuse line in a second stage. Then, after forming a mold portion made from synthetic resin for packaging the capacitor element part, the solid electrolytic capacitor is separated from the lead frame in a third stage.

In securing the anode bar of the capacitor element with the anode lead terminal by welding or the like after supplying the capacitor element between each of the anode lead terminal and the cathode lead terminal in the lead frame in this manufacturing method, however, there always exists an mounting error due to a bend or the like of the anode bar 5 such that the capacitor element 3 is inclined in the horizontal direction to the right or left (in the direction orthogonal to the center line of the both lead terminals within the plane of the lead frame), e.g., by an angle θ1 in the left direction with respect to the center line of the both lead terminals 1 and 2 or by an angle θ2 in the right direction as shown by a one-dot chain line in FIG. 11 or in the vertical direction (in the direction orthogonal to the plane of the lead frame) as shown in FIG. 12.

By the way, it is practically impossible to correct the inclination of the capacitor element 3 caused by the mounting error after securing the capacitor element 3 to the anode lead terminal 1 by welding or the like. That is, while a stress has to be applied to the capacitor element so as to bend it in the direction opposite from the direction of the inclination thereof to correct the inclination, a dielectric breakdown is caused in the dielectric film of the chip piece of the capacitor element if the stress is applied to the capacitor element.

Meanwhile, if the angle of the inclination is large, it results a defective element as the capacitor element 3 is exposed through the side of the mold section 8 for packaging the capacitor element 3 or a thickness of the mold section 8 for covering the capacitor element 3 becomes very thin.

Then, in the manufacturing method described above, the inclination of the capacitor element 3 in the right/left direction with respect to the center line of the both lead terminals 1 and 2 is detected after securing the capacitor element 3 to each anode lead terminal 1 by welding or the like and when the inclination exceeds a predetermined limit, i.e., it exceeds an allowance for preventing defective parts caused by the inclination from being produced, it is cut off from the lead frame by cutting the lead terminals 1 and 2.

Accordingly, there has been a problem that the production cost is increased considerably because such a manufacturing method lowers the production yield.

SUMMARY OF THE INVENTION

Accordingly, it is an object of the present invention to solve the aforementioned problem by providing a manufacturing method which allows an inclination caused by an mounting error which is generated when a capacitor element is secured to an anode lead terminal in a lead frame to be corrected without applying stress to the capacitor element and thereby a yield to be increased steadily.

In accordance with the present invention, there is provided a method for manufacturing a packaged solid electrolytic capacitor, comprising steps of:

(a) electrically connecting an anode bar of a capacitor element with an anode lead terminal of a lead frame having the anode lead terminal and a cathode lead terminal;

(b) detecting a degree and a direction of an inclination of the capacitor element with respect to the anode lead terminal and pressing and deforming a portion of the anode lead terminal corresponding to the direction of the inclination when the degree of the inclination exceed a predetermined value; and (c) packaging said capacitor element part by synthetic resin.

In the event that the detecting of the inclination of the capacitor element with respect to the anode lead terminal is a detecting of an inclination in a direction orthogonal to a direction of the anode lead terminal within a plane of the lead frame (referred to as "horizontal direction" or "left or right direction"), and the inclination exceeds the predetermined value, the inclination is corrected by that a side portion of the tip of the anode lead terminal on the side where the capacitor element is inclined is press-deformed.

In the event that the detecting of the inclination of the capacitor element with respect to the anode lead terminal is a detecting of an inclination in a direction orthogonal to a plane of the lead frame (referred to as "vertical direction") ,and the inclination in the direction orthogonal to the plane of the lead frame exceeds the predetermined value, the inclination is corrected by that the tip of the anode lead terminal is bend-deformed by pressing it from the side where the capacitor element is inclined.

The detecting of the inclination of the capacitor element may be performed by perceiving the inclination by a camera and by processing its image.

It is preferable to form a through hole at the tip of the anode lead terminal in the same time when the anode lead terminal of the lead frame is formed since it allows to prevent the lead terminal from slipping out of the package and to readily press-deform the anode lead terminal partially.

According to the inventive manufacturing method, when a portion of the tip of the anode lead terminal on the right side or left side of the anode bar is press-deformed in the thickness direction, the right side portion or the left side portion is deformed so as to extend in the width direction of the anode lead terminal and due to the extended-deformation in the width direction, the inclination of the capacitor element in the horizontal direction with respect to the both lead terminals changes. Accordingly, the press-deformation of the right side portion or left side portion in the thickness direction allows the inclination of the capacitor element in the horizontal direction with respect to the both lead terminals to be corrected so that it becomes small without applying a large stress to the capacitor element itself.

Further, a top or back face of the tip of the anode lead terminal in part where the anode bar is not secured is press-deformed in the thickness direction and due to the press-deformation in the thickness direction, the inclination of the capacitor element in the vertical direction with respect to the both lead terminals changes. Accordingly, the press-deformation of the lead terminal in the thickness direction allows the inclination of the capacitor element in the vertical direction with respect to the both lead terminals to be corrected so that it becomes small without applying a large stress to the capacitor element itself.

The above and other advantages of the invention will become more apparent in the following description and the accompanying drawings in which like numerals refer to like parts.

DETAILED DESCRIPTION OF PREFERRED EMBODIMENTS

One preferred embodiment of the present invention will be explained below with reference to FIGS. 1 through 7. It is noted, however, that the present invention will not be confined thereto.

Figure 1:
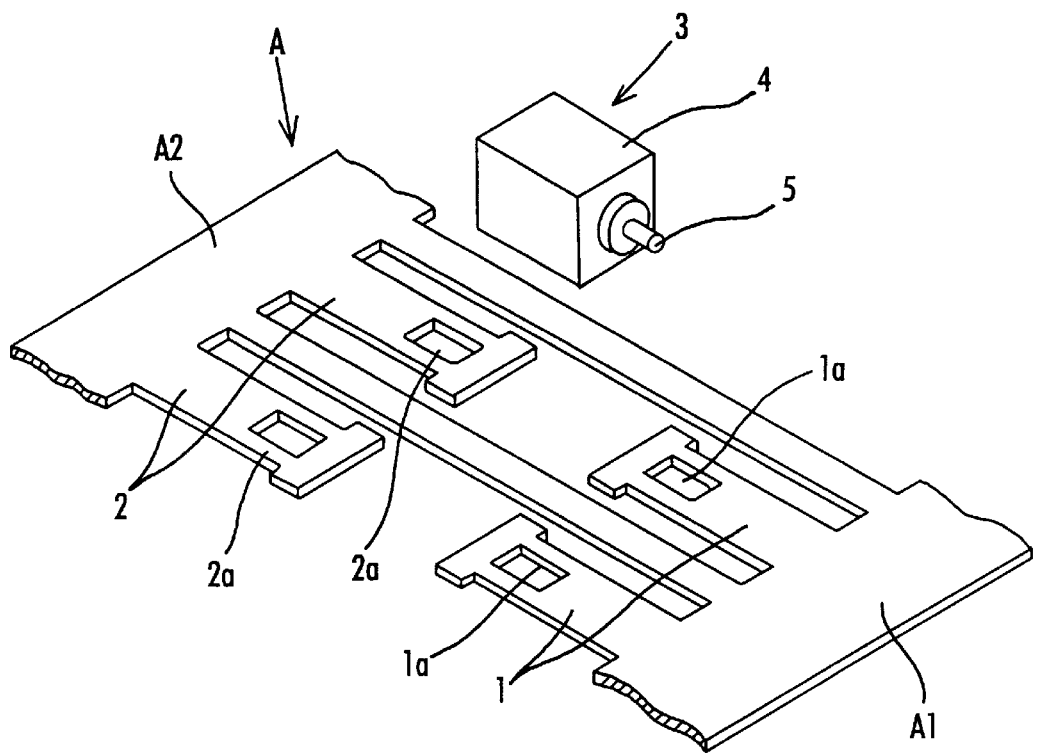
FIG. 1 is a perspective view of a lead frame used in an inventive method for manufacturing a packaged solid electrolytic capacitor.

In FIG. 1, reference character A denotes a lead frame made from a metal plate such as an alloy of copper and nickel and has a pair of right and left side frames A1 and A2 extending in the longitudinal direction thereof. Anode lead terminals 1 and cathode lead terminals 2 which face each other are formed in one body with the pair of side frames A1 and A2 with an adequate pitch in the longitudinal direction. In this case, a through hole 1a for preventing the anode lead terminal 1 from slipping out of a package is formed through the tip of the anode lead terminal 1 and a through hole 2a for preventing the cathode lead terminal 2 from slipping out is perforated through the tip of the cathode lead terminal 2.

A capacitor element 3 has a chip piece 4 formed by compressing tantalum powder and an anode bar 5 projecting out of one end face of the chip piece 4.

While transferring such a lead frame A intermittently in the longitudinal direction by conventional a roller driving method not shown, the following process or check is carried out in each stage.

Figure 2:
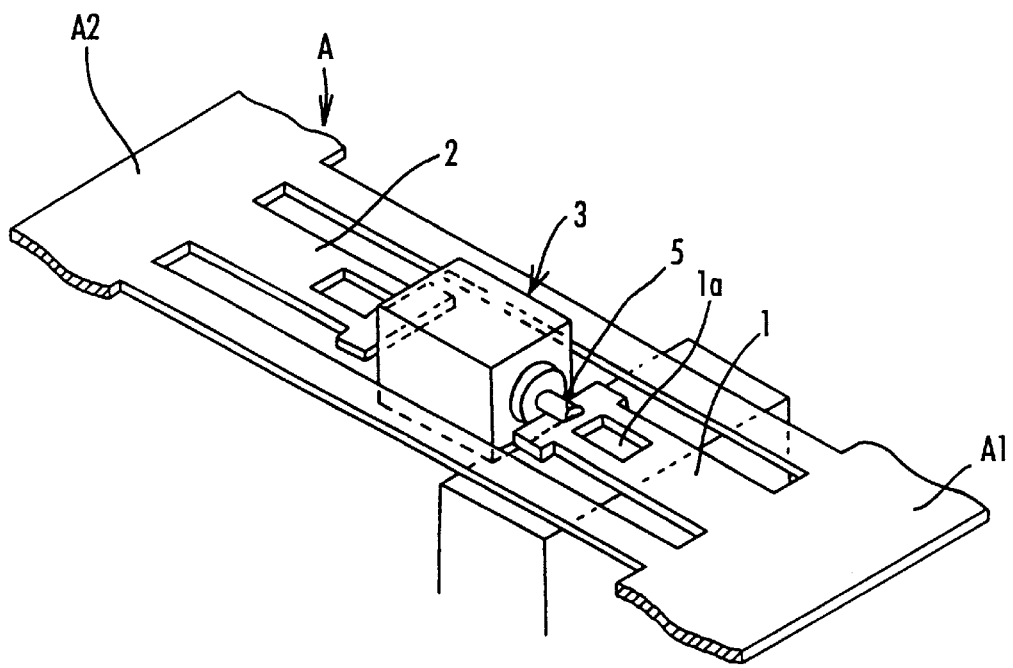
FIG. 2 is a perspective view showing a state wherein a capacitor element is secured in the lead frame.

At first, each capacitor element 3 is mounted between the anode lead terminal 1 and the cathode lead terminal 2 so that the anode bar 5 thereof abuts with the top face of the anode lead terminal 1 as shown in FIG. 2 and the anode bar 5 is secured to the anode lead terminal 1 by arc welding or the like in the first stage.

Next, an inclination of the capacitor element 3 in the horizontal (right/left) direction with respect to a center line of the both lead terminals 1 and 2 is detected in the second stage. It is noted that the inclination is detected by imaging the capacitor element 3 part from the top by a camera not shown and by processing the image.

Figure 3:
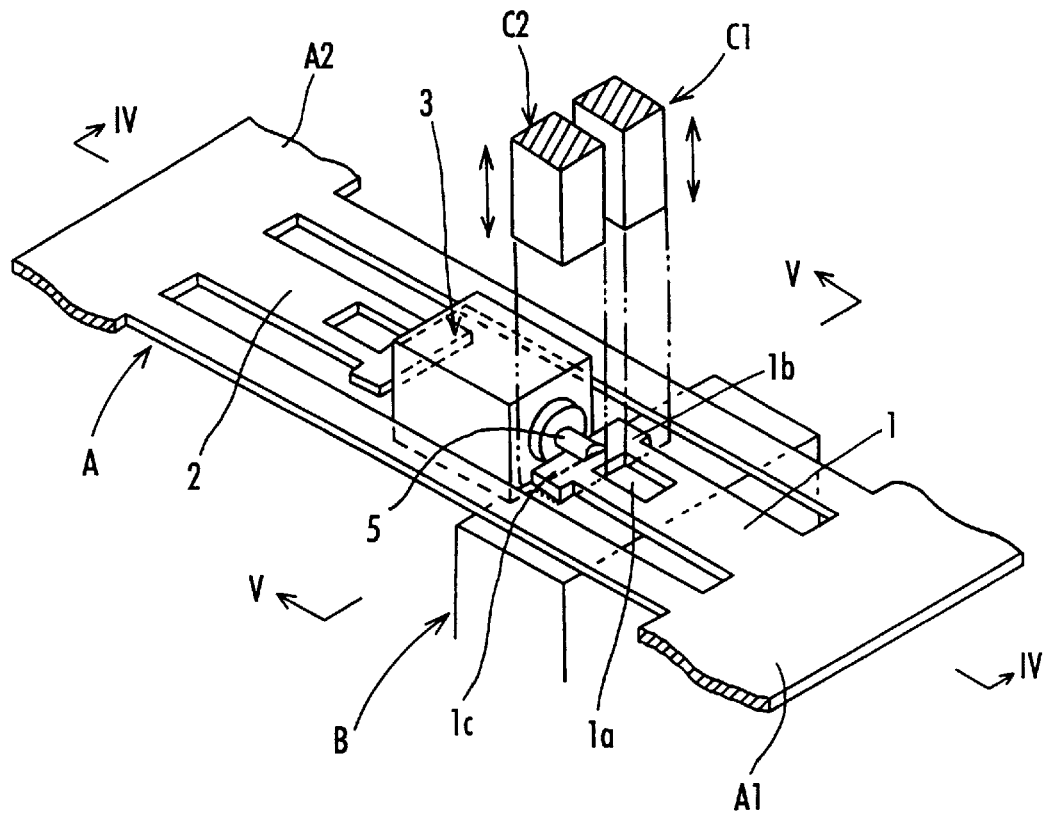
FIG. 3 is a perspective view showing a state wherein an inclination of the capacitor element is corrected.
Figure 4:
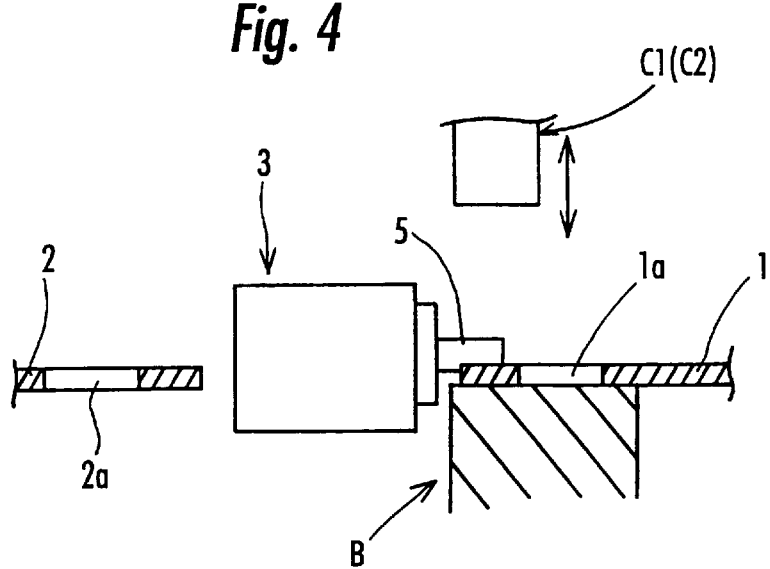
FIG. 4 is a section view taken along a line IV-IV in FIG. 3.
Figure 5:
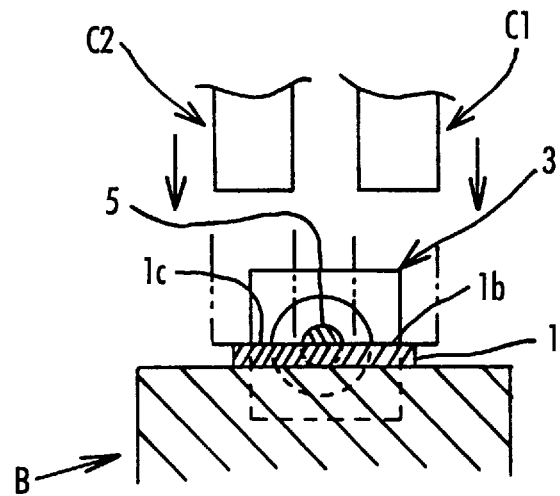
FIG. 5 is a section view taken along a line V-V in FIG. 3.

Then, in the third stage, a portion 1b of the tip of each anode lead terminal 1 on the right side of the anode bar 5 or a portion 1c on the left side is squash-deformed by pressing in the thickness direction corresponding to the detected inclination by a stationary pedestal die B disposed underside of the lead frame A and a pair of right and left movable punches C1 and C2 disposed above the lead frame A as shown in FIGS. 3 through 5 (First Process).

That is, when the inclination of the capacitor element 3 in the horizontal direction with respect to the center line of the both lead terminals 1 and 2 is within a predetermined allowance, the element is passed as it is without squash-deforming the tip of the anode lead terminal 1.

Figure 6:
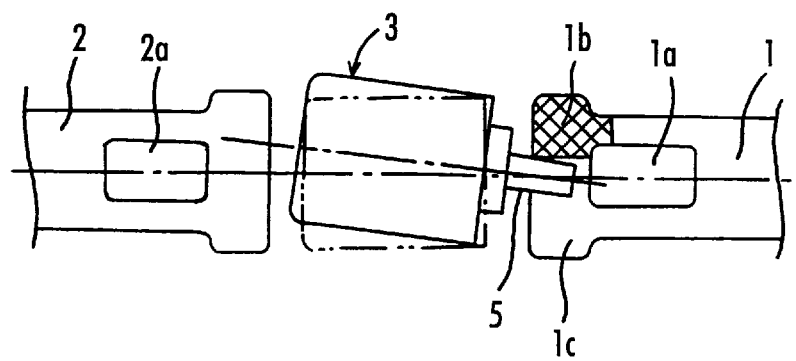
FIG. 6 is a plan view showing a state wherein the capacitor element is inclined in the right direction with respect to lead terminals.

When the capacitor element 3 is inclined in the right direction with respect to the center line of the both lead terminals 1 and 2 as shown in FIG. 6 and the inclination exceeds the predetermined allowance, the right side portion 1b of the anode lead terminal 1 is squash-deformed in the thickness direction by moving down one movable punch C1.

Then, due to the squash-deformation, the right side portion 1b is deformed so as to extend in the width direction of the anode lead terminal 1 and the anode bar 5 is dislocated in the left direction, so that the inclination of the capacitor element 3 in the right direction may be corrected so that it stays within the predetermined allowance as indicated by a two-dot chain line in FIG. 6.

Figure 7:
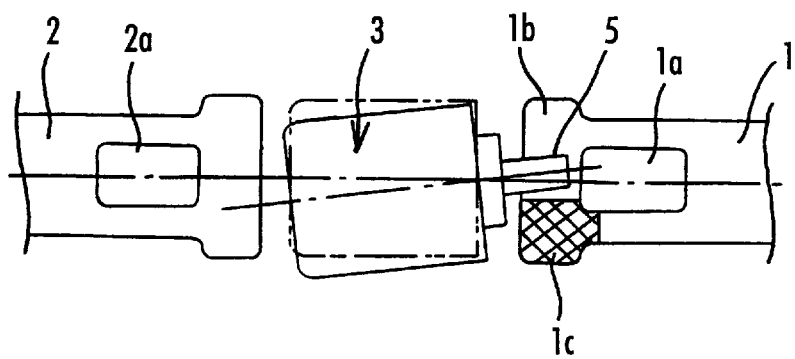
FIG. 7 is a plan view showing a state wherein the capacitor element is inclined in the left direction with respect to the lead terminals.

Further, when the capacitor element 3 is inclined in the left direction with respect to the center line of the both lead terminals 1 and 2 as shown in FIG. 7 and the inclination exceeds the predetermined allowance, the left side portion 1c of the anode lead terminal 1 is squash-deformed in the thickness direction by moving down the other movable punch C2.

Then, due to the squash-deformation, the left side portion 1c is deformed so as to extend in the width direction of the anode lead terminal 1 and the anode bar 5 is dislocated in the right direction, so that the inclination of the capacitor element 3 in the left direction may be corrected so that it stays within the predetermined allowance as indicated by a two-dot chain line in FIG. 7. It is noted that the squash-deformation in the thickness direction may be controlled so as to be proportional to the inclination by reducing the squash-deformation when the inclination is large for example.

The lead frame A is transferred further to detect an inclination of the capacitor element 3 in the vertical direction with respect to the center line of the both lead terminals 1 and 2 in the fourth stage. It is noted that this inclination is detected by imaging the capacitor element 3 part from the horizontal direction by imaging means such as a camera and by processing the image.

Figure 8:
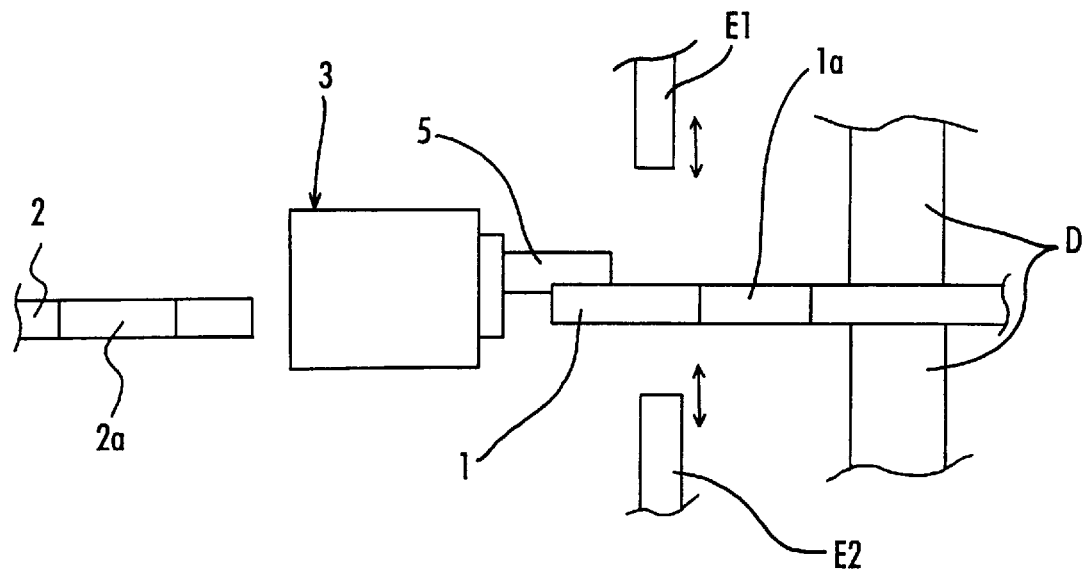
FIGS. 8 and 9 are explanatory diagrams for explaining processes for correcting an inclination of the capacitor element in the vertical direction in the inventive method for manufacturing the solid electrolytic capacitor.

Next, in the fifth stage, as shown in FIG.8, the top or back face of the tip of the anode lead terminal 1 is press-deformed in the vertical direction by pressing in the thickness direction corresponding to the detected inclination by selecting either of a pair of upper and lower pressing punches E1 and E2 disposed in the vertical direction of the lead frame A while holding the top and back faces of the lead frame A by a stationary die D disposed similarly in the vertical direction of the lead frame A (Second Process).

That is, when the inclination of the capacitor element 3 in the vertical direction is within a predetermined allowance, the element is passed as it is without press-deforming the anode lead terminal 1.

Figure 9:
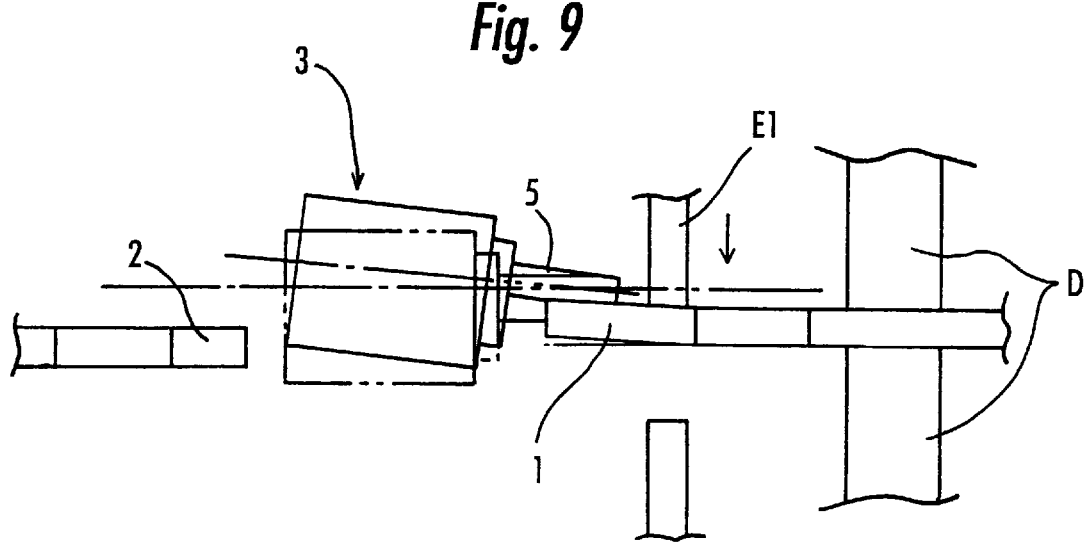

When the capacitor element 3 is inclined upward as shown in FIG. 9 and the inclination exceeds the predetermined allowance, the anode lead terminal 1 is press-deformed downward by moving down one movable punch E1.

Then, due to the press-deformation, the anode lead terminal 1 is bend-deformed and the anode bar 5 is dislocated downward, so that the upward inclination of the capacitor element 3 may be corrected so that it stays within the predetermined allowance as indicated by a two-dot chain line in FIG. 9.

Figure 10:
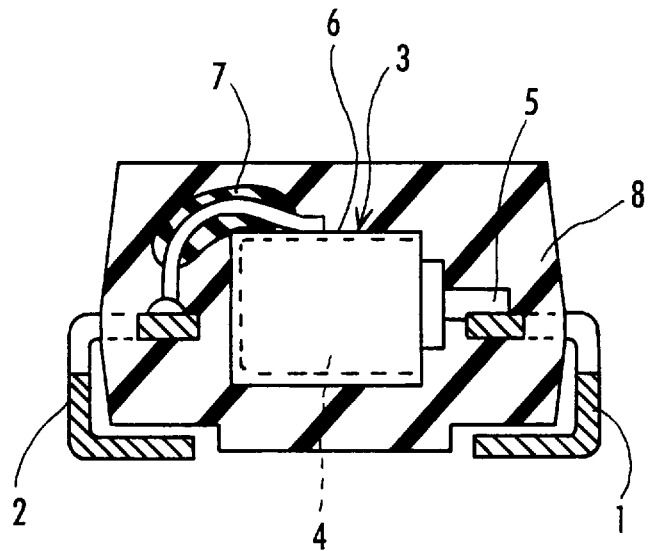
FIG. 10 is a sectional explanatory view of a prior art solid electrolytic capacitor.
Figure 11:
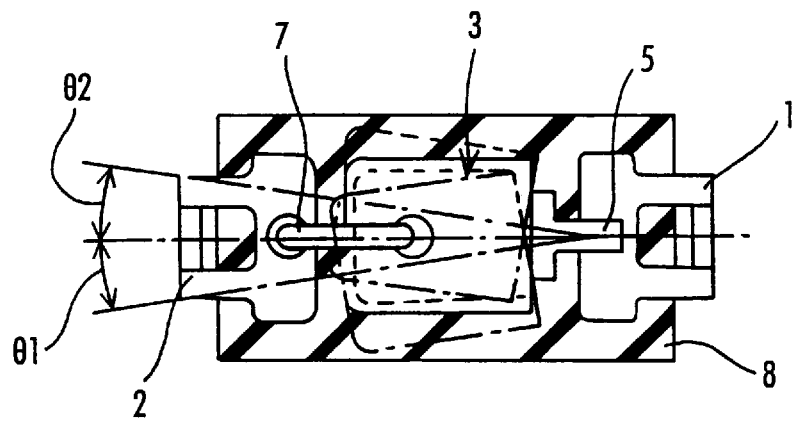
FIG. 11 is a diagram for explaining an inclination of a prior art capacitor element in the horizontal direction.
Figure 12:
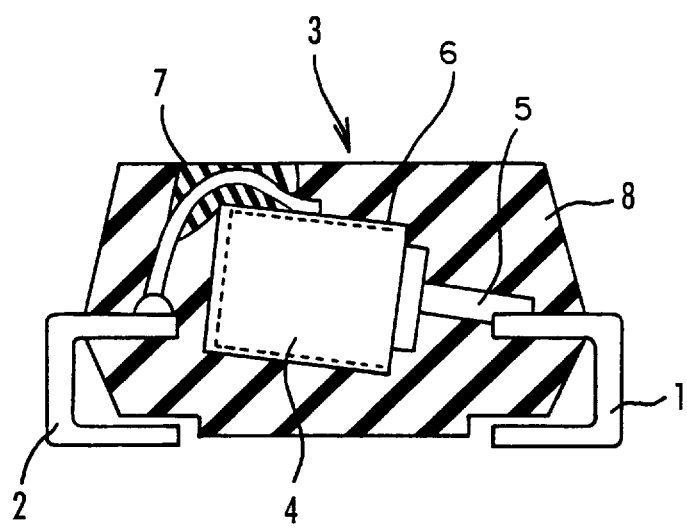
FIG. 12 is a diagram for explaining an inclination of the prior art capacitor element in the vertical direction.

After correcting the inclinations of each capacitor element 3 in the horizontal and vertical directions so that they stay within the predetermined allowances as described above, a cathode film 6 (shown in FIG. 10) on the surface of the chip piece 4 of each capacitor element 3 and the tip of each cathode lead terminal 2 is connected electrically by a safety fuse line 7 such as a soldering wire with a method same with that described in Japanese Patent Laid-Open No. 244233/1994. Next, the capacitor element 3 part is separated from the lead frame A after packaging it by molding a mold section made from synthetic resin. A packaged solid electrolytic capacitor as described before and as shown in FIG. 10 may be thus obtained.

In the embodiment described above, while a pressing force of the movable punches C1 and C2 in the first process is kept constant without changing corresponding to the inclination of the capacitor element, a pressing stroke of the movable punches C1 and C2 is changed corresponding to the inclination of the capacitor element. For example, while the pressing force is kept constant at about 10 kg, the pressing stroke is about ⅕ of a size of the inclination (moved size in the longitudinal direction of the lead frame) of the capacitor element. Such a relationship between the pressing stroke and the inclination of the capacitor element may be determined empirically from an experimental result obtained by carrying out the correction of the inclination of the capacitor element by a plurality of times under various conditions while keeping the pressing force of the movable punches C1 and C2 at almost constant. It is also possible to obtain theoretically from the quality of the material of the lead frame. A relationship between a pressing stroke of the pressing punches E1 and E2 and the inclination of the capacitor element in the second process may be also obtained in the same manner with the method for deriving the above-mentioned relationship in the first process.

Although the detection of the inclination of the capacitor element and the deformation of the anode lead terminal 1 have been carried out in the separate stages in the first and second processes, respectively, in the embodiment described above, the present invention is not confined to that and it is possible to carry out them in the same stage.

Further, although the first process for correcting the inclination in the horizontal direction and the second process for correcting the inclination in the vertical direction have been carried out in succession in the embodiment described above, normally the inclination in the horizontal direction occurs more often and almost no inclination in the vertical direction occurs. In such a case, the production yield may be improved further just by carrying out the first process.

In the present invention, after correcting the inclination in the vertical and/or horizontal direction of the capacitor element as described in the embodiment, an inclination of the capacitor element in each direction is detected again to discriminate whether the inclination of the capacitor element has been steadily corrected or not. Thereby, it becomes possible to deform the anode lead terminal 1 further when the inclination of the capacitor element has not been corrected yet and the production yield may be improved further.

According to the present invention, capacitor elements inclined largely in the horizontal/vertical direction with respect to the both lead terminals among capacitor elements secured to each anode lead terminal of the lead frame need not be cut off from the lead frame in manufacturing solid electrolytic capacitors by using the lead frame and the solid electrolytic capacitors may be manufactured by using almost all of the capacitor elements, so that the production yield may be steadily improved and the production cost can be reduced considerably.

While a preferred embodiment has been described, variations thereto will occur to those skilled in the art within the scope of the present inventive concepts which are delineated by the following claims.

What is claimed is:

1. A method for manufacturing a packaged solid electrolytic capacitor, comprising steps of:
    (a) electrically connecting an anode bar of a capacitor element with an anode lead terminal of a lead frame having said anode lead terminal and a cathode lead terminal;
    (b) detecting a degree and a direction of an inclination of said capacitor element with respect to said anode lead terminal and pressing and deforming a portion of said anode lead terminal corresponding to the direction of the inclination when the degree of said inclination exceeds a value; and
    (c) packaging said capacitor element part by synthetic resin.

2. The manufacturing method according to claim 1, wherein the detecting of the inclination of said capacitor element with respect to said anode lead terminal is a detecting of an inclination in a direction orthogonal to a direction of said anode lead terminal within a plane of said lead frame and when said inclination exceeds the value, a side portion of the tip of said anode lead terminal on the side where said capacitor element is inclined is press-deformed.

3. The manufacturing method according to claim 2, wherein the press-deformation of said anode lead terminal is carried out by squash-deforming said anode lead terminal in the thickness direction.

4. The manufacturing method according to claim 1, wherein the detecting of the inclination of said capacitor element with respect to said anode lead terminal is a detecting of an inclination in a direction orthogonal to a plane of said lead frame and when said inclination in the direction orthogonal to the plane of said lead frame exceeds the value, the tip of said anode lead terminal is bend-deformed by pressing it from the side where said capacitor element is inclined.

5. The manufacturing method according to claim 2, wherein a detecting of an inclination in a direction orthogonal to a plane of said lead frame is added to the detecting of the inclination of said capacitor element within the plane of said lead frame and when the inclination in the direction orthogonal to the plane of said lead frame exceeds the value, the tip of said anode lead terminal is bend-deformed by pressing it from the side where said capacitor element is inclined.

6. The manufacturing method according to claim 1, wherein the detecting of the inclination of said capacitor element is performed by perceiving the inclination by a camera and by processing its image.

7. The manufacturing method according to claim 1, wherein a through hole is formed at the tip of said anode lead terminal at the same time when said anode lead terminal of said lead frame is formed.

8. The manufacturing method according to claim 1, wherein said lead frame is formed so that said anode lead terminal and said cathode lead terminal face each other with a certain gap and said anode bar of said capacitor element is connected electrically with said anode lead terminal so that a chip piece of said capacitor element is positioned in a gap portion where said both lead terminals face each other.

* * * * *